United States Patent
Feese et al.

(10) Patent No.: US 6,176,385 B1
(45) Date of Patent: Jan. 23, 2001

(54) COVERABLE CONTAINER AND ARMREST FOR A VEHICLE

(75) Inventors: Jochen Feese, Boeblingen; Oliver Hasenoehrl, Hildrizhausen, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/268,704

(22) Filed: Mar. 16, 1999

(30) Foreign Application Priority Data

Mar. 18, 1998 (DE) ............................................. 198 11 783

(51) Int. Cl.⁷ ..................................................... B65D 45/22
(52) U.S. Cl. ............................................. 220/326; 220/833
(58) Field of Search .................................... 220/4.01, 833, 220/835, 326; 224/539, 275; 292/35

(56) References Cited

U.S. PATENT DOCUMENTS

| | | | |
|---|---|---|---|
| 1,671,249 | * | 5/1928 | Lieberman . |
| 1,752,634 | * | 4/1930 | Fildes . |
| 4,809,897 | * | 3/1989 | Wright, Jr. ............................ 224/282 |
| 4,934,750 | * | 6/1990 | Eichler et al. ....................... 296/37.8 |
| 5,280,848 | * | 1/1994 | Moore .................................... 224/275 |
| 5,639,002 | | 6/1997 | Weitbrecht et al. . |
| 5,715,966 | * | 2/1998 | Nagano et al. ....................... 220/339 |

FOREIGN PATENT DOCUMENTS

| | | |
|---|---|---|
| 4443521C1 | 1/1996 | (DE) . |
| 19643051C1 | 11/1997 | (DE) . |
| 62-123453 | 8/1987 | (JP) . |

OTHER PUBLICATIONS

United Kingdom Search Report, Jun. 9, 1999.
Office Action from Japanese Patent Office, together with English Translation.

\* cited by examiner

*Primary Examiner*—Stephen Castellano
(74) *Attorney, Agent, or Firm*—Evenson, McKeown, Edwards & Lenahan, P.L.L.C.

(57) ABSTRACT

A container for installation beside seats in vehicles, especially for installation as a center console between the front seats of a motor vehicle, has a housing that is box-shaped and open at the top. A lid is pivotable around a pivot axis integral with the housing and simultaneously designed as an arm rest which covers the housing opening. A latching device is operable between the housing and the lid for locking the lid in pivot positions on the housing that modify the height of the arm rest. To provide an economical and stable adjustability of the arm rest, which requires only a small amount of space for installation, a latching device consisting of a latching strip and latching member is provided on an underside of the housing that is opposite the pivot axis of the lid. The latching member has a latching pin guided displaceably lengthwise on the lid and the latching strip is mounted on a housing wall of the housing that extends transversely to the displacement direction of the latching pin.

19 Claims, 4 Drawing Sheets

COVERABLE CONTAINER AND ARMREST FOR A VEHICLE

BACKGROUND AND SUMMARY OF THE INVENTION

This application claims the priority of German application 198 11 783.3-21, filed in Germany on Mar. 18, 1998, the disclosure of which is expressly incorporated by reference herein.

The invention relates to a coverable container for installation beside seats in vehicles, especially for installation as a center console between the front seats of a motor vehicle. Preferred embodiments relate to such a container having a lid pivotable around a pivot axis integral with the housing and simultaneously designed as an arm rest, for covering the housing opening, and with a latching device operable between the housing and the lid for locking the lid in pivot positions that modify the height of the arm rest on the housing, said device comprising a latching strip with latching holes arranged vertically above one another and a latching member that drops into them for locking.

In a known container of this kind (German Patent Document DE 44 43 521 C1) the latching device with the latching strip and latching member is located between the lid and the housing wall of the housing located beneath the pivot axis of the lid, said walls extending parallel to the pivot axis. The latching member is formed at the end of a lever articulated to the underside of the lid at a slight distance from the pivot axis, and engages by a latching nose, a latching strip mounted vertically in the housing interior of the housing wall. A guide pin projecting from the latching member is guided in a bracket that reverses the guide pin in such fashion that the guide pin, when the lid is lifted, is located in a path section in which the latching nose is pushed by spring force into the teeth and when the lid is lowered, following a previous maximum pivoting of the lid away from the housing opening, lies in a path section in which the latching nose is lifted out of the teeth. To set different heights of the arm rest, the lid is pivoted upward in stages around its pivot axis. At each pivot stage the latching nose locks the lid in the teeth to keep it from falling back. It is only after the maximum pivot position is reached (container opened completely) that the latching member is reversed and the latching nose is pulled out of the teeth so that the lid can be pivoted back into the closed position without interruption. This height adjustment of the lid in the hinge area however has the disadvantage that the latching device is subjected to considerable stress because of the high bending moments that develop and consequently must be made very stable. For this reason, it also requires a correspondingly large area for installation which is not always available or must be provided at the expense of storage space.

In a likewise known container (German Patent Document DE 196 43 051 C1) a stable height adjusting device is provided for the arm rest with small installation dimensions between the housing and the arm rest, a closing plate covering the housing opening is provided that is pivotable around the pivot axis of the arm rest. A supporting lever extends at a lengthwise distance from the pivot axis between the arm rest and the closing plate, with the supporting point of the lever located near the front end of the closing plate that faces away from pivot axis being made displaceable in the lengthwise direction of the arm rest and lockable by a manually releasable locking device. In this known container, the height adjusting device for the arm rest is quite stable but the additionally required closing plate for supporting the support lever makes its construction costly, in addition to the fact that the closing plate must be locked twice, once at the housing and once at the arm rest, so that it can be pivoted away from the housing together with the arm rest for access to the interior of the container.

A goal of the invention, in a container of the species recited at the outset, is to provide an economical and stable adjustment of the arm rest that requires only a small amount of space for installation.

This goal is achieved according to the invention in a container of the above-mentioned type, by providing an arrangement wherein the latching device is located on a side of the housing that is opposite the pivot axis, wherein the latching device comprises at least one spring-loaded latching pin which is aligned parallel to the pivot axis of the lid and guided displaceably lengthwise in the lid, and wherein the latching strip has as latching holes and is provided on a housing wall of the housing that extends transversely to the lengthwise axis of the latching pin.

The container according to the invention has the advantage that because of the existing double mounting of the arm rest, namely at the rear at the pivot axis and at the front at the latching device, the loads on the latching device are significantly lower. As a result, economical materials can be used for the latching device and the parts can be made smaller.

Designing the latching member as a spring-elastic latching pin that is guided lengthwise displaceably in the lid parallel to its pivot axis and providing the latching strip with latching holes on a side wall extending transversely to the lengthwise axis of the latching pin produces a sturdy latching device that can withstand high loads and does not prevent access to the interior of the container. The latching device can be released in an ergonomically favorable manner by simple kinematics using a manually operable button, entailing a simple lengthwise sliding of the latching pin. The latching pin and kinematics can be mounted on a kinematics support on the underside of the lid where they take up little space, so that an economical design with simple assembly results.

Advantageous embodiments of the container according to the invention with advantageous improvements and designs of the invention are described below and in the claims.

According to one preferred embodiment of the invention, the latching member has at least one spring-loaded latching pin guided displaceably lengthwise on the lid, while the latching strip is mounted on a housing wall that extends transversely to the lengthwise axis of the latching pin. Preferably the at least one latching pin is aligned parallel to the pivot axis of the lid and the latching strip is mounted on a long wall of the housing. The latching pin is displaced lengthwise by means of a manually operable button located on the lid. This button is coupled by kinematics with the latching pin, with the latching pin and kinematics being located on the underside of the lid, which is lowered into the container opening, in the front end area of the lid. In the kinematics a pin is preassembled on a kinematic support which is then installed complete in the front area of the lid on the underside of the lid. This produces an economical design with a simple assembly.

Other objects, advantages and novel features of the present invention will become apparent from the following detailed description of the invention when considered in conjunction with the accompanying drawings.

DETAILED DESCRIPTION OF THE DRAWINGS

Figure 1:
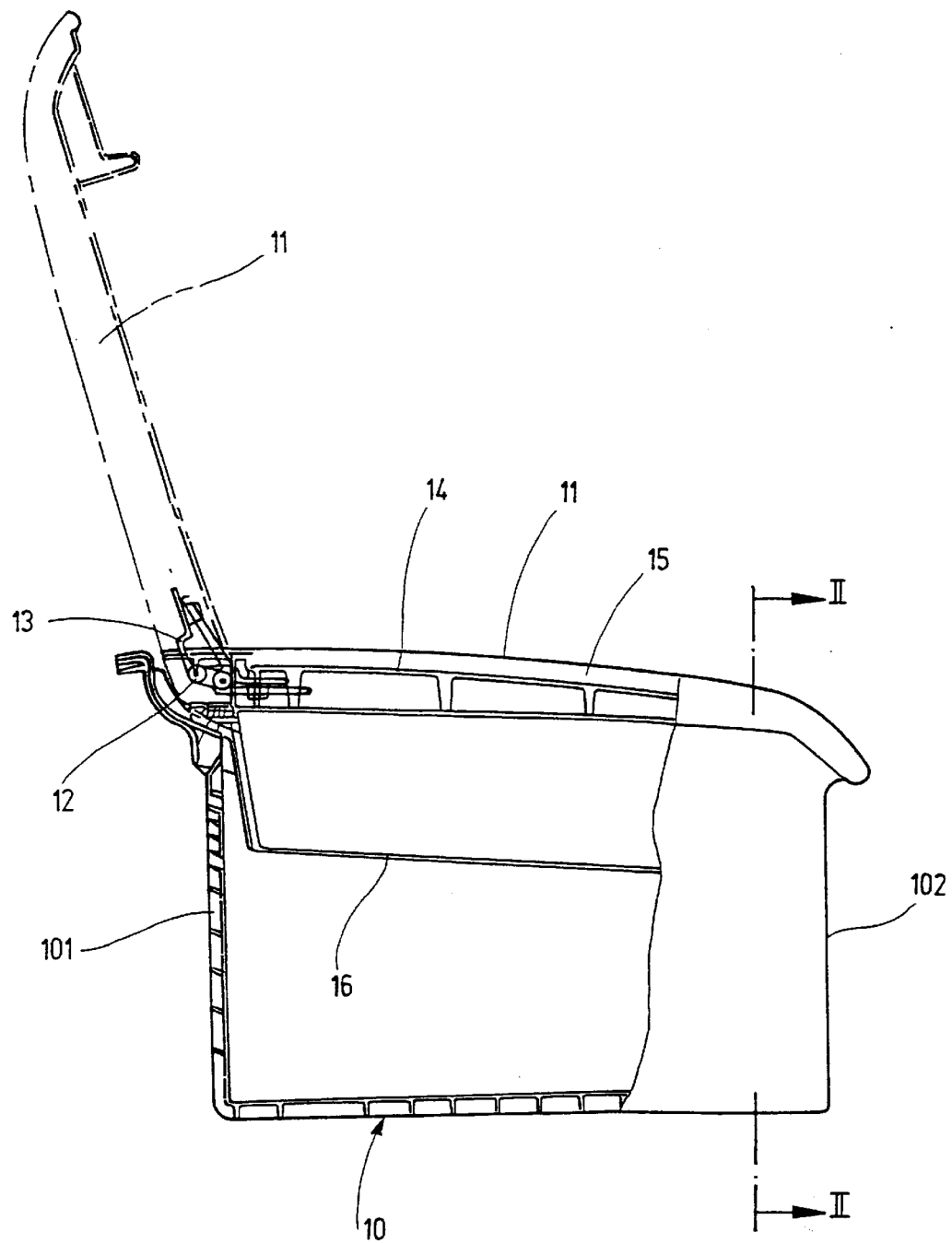
FIG. 1 is a side part sectional view of a coverable container for installation in a vehicle, constructed according to a preferred embodiment of the present invention.

The coverable container shown in FIG. 1 in a side view and partially cut away is intended for installation beside the seats in vehicles, especially for installation as a center console between the front seats of a motor vehicle. In addition to accepting any objects, the container also serves as an arm rest or arm support for the driver or passenger. The container has an elongate box-shaped housing 10 open at the top and coverable by a closing lid or a closing flap, hereinafter called lid 11.

Lid 11 is pivotable around a pivot axis 12 secured in a hinge 13 that is fastened to the narrow rear wall 101 of housing 10 that is at the rear in the travel direction. Pivot axis 12 is then aligned transversely to the lengthwise axis of housing 10 while the lengthwise axis of housing 10, following installation of the container in the motor vehicle, extends parallel to the lengthwise axis of the vehicle. Lid 11 itself consists of a support 14 made of plastic that is coated with a hard foam 15, while a thicker foam cushion is provided on the top of support 14 to provide a comfortable arm rest. At the end facing away from hinge 13, lid 11 is releasably secured by means of a snap latch not shown here to the narrow housing front wall 102 which is opposite the housing rear wall 101. In FIG. 1, the lid 11 which is in the closed position is represented by solid lines and lid 11 in the open position is represented by dashed lines. With lid 11 open, a storage shell 16 is visible that covers the housing opening in the upper area and can be pivoted outward out of housing 10 for access to the housing interior area located beneath.

A latching device 17 is provided on the side of the housing that is opposite the pivot axis 12 on the lengthwise axis of the container, in other words next to the front wall 102 of the housing, between housing 10 and lid 11 for locking lid 11 to housing 10 in a plurality of pivot positions of lid 11 that modify the height of the arm rest. This arrangement facilitates the use of lid 11 as an arm rest with an adjustable height. As can be seen from FIG. 2 the latching device 17 includes a latching strip 18 with latching holes 19 arranged vertically above one another and at a distance from one another, and a spring-loaded pin 20 guided displaceably lengthwise on the lid, said pin being able under the influence of a compression spring 21 to slide into latching holes 19 by a latching cam 201 that is made in one piece and projects. Latching pin 20 is designed to be displaceable transversely and therefore extends parallel to pivot axis 12 while latching strip 18 projects upward on one long housing side wall 103 as an extension of housing side wall 103. Latching strip 18 in this case can be made in one piece with housing wall 103 or can be fastened to housing wall 103 as a separate part. The latching strip 18 provided with two latching holes 19 is designed so that when lid 11 covers the housing opening it extends along the side wall 111 of the lid and terminates a short distance below the surface of lid 11.

Figure 3:
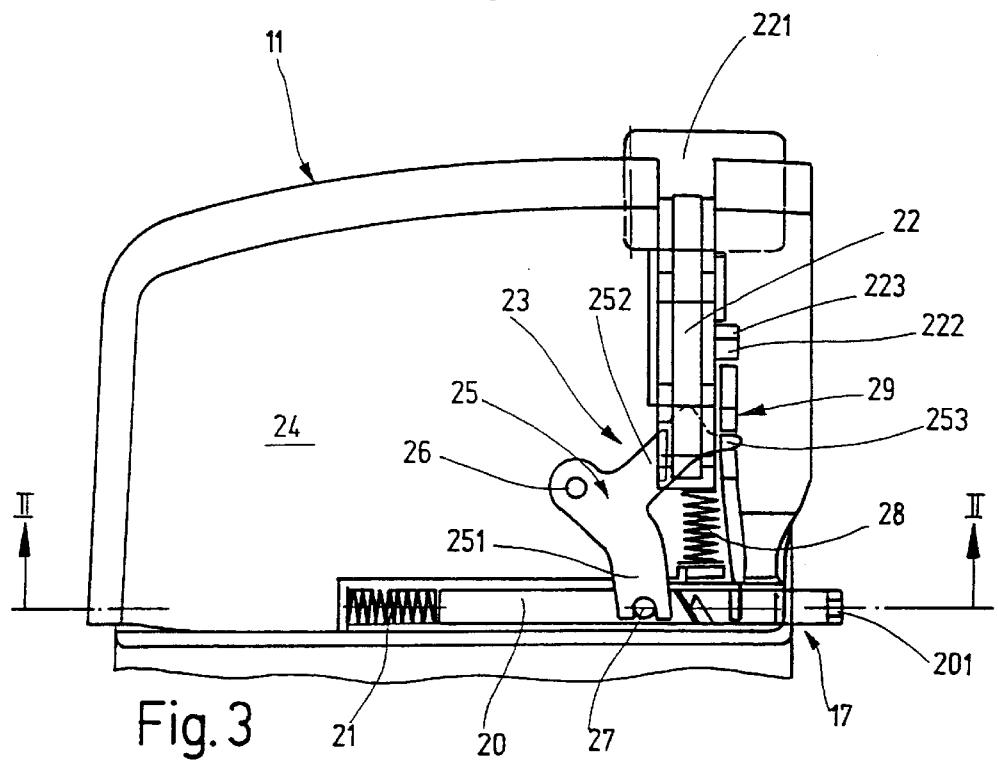
FIG. 3 is a section along line III—III in FIG. 2.
Figure 4:
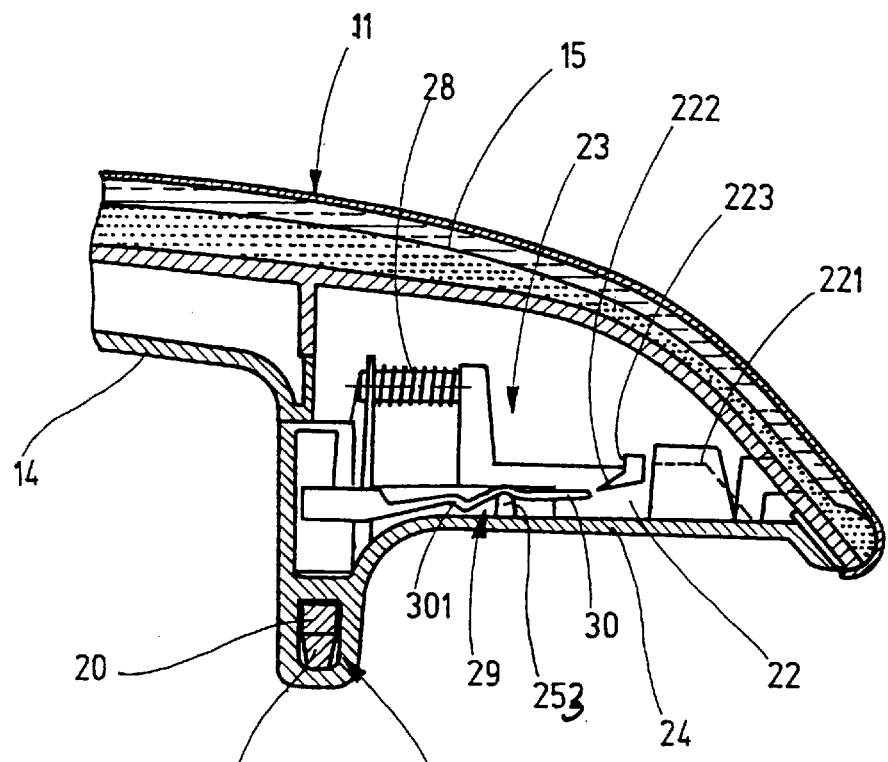
FIG. 4 and FIG. 5 each show in part a section along line IV—IV with two different switch positions of adjusting kinematics.
Figure 5:
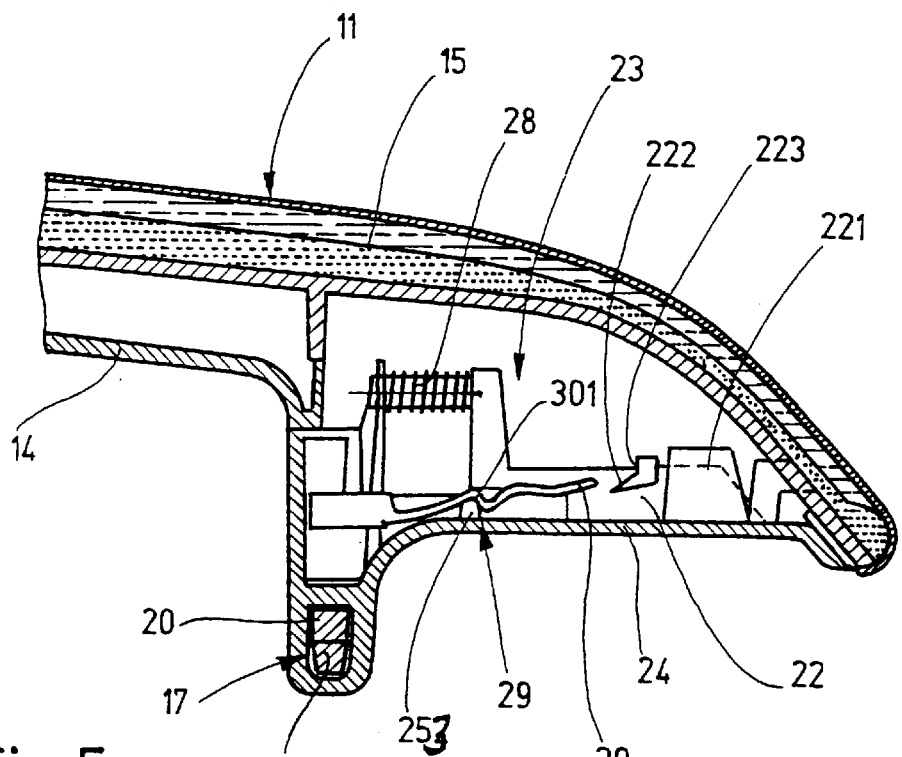

For lengthwise displacement of the latching pin 20 against the force of compression spring 21, a manually operable button 22 is mounted on lid 11, said button being coupled by kinematic linkage 23 with latching pin 20 in such fashion that when button 22 is pushed inward in the direction of the lengthwise axis of housing 10, latching pin 20 is displaced against compression spring 21, with its latching cam 201 escaping from the latching holes 19 of latching strip 18, and latching device 17 is therefore unlocked. Button 22 together with kinematic linkage 23 and latching pin 20 is preassembled with compression spring 21 on a kinematics support 24 that is fastened at the forward end of lid 11 to its underside. Button 22 then projects with a button head 221 through a recess in the front end of lid 11 as indicated in FIGS. 3–5. Button head 221 can be designed so that it covers the recess in lid 11 shapewise when it is in the non-operating state.

Kinematic linkage 23 essentially comprises a two-armed reversing lever 25 which is mounted so that it can pivot around a pivot axis 26 that is aligned at right angles to the plane spanned by the displacement devices of button 22 and latching pin 20. One lever arm 251 of reversing lever 25 is coupled in a rotationally movable fashion with latching pin 20 by a dog 27 (FIGS. 2 to 3), while the other lever arm 252 abuts the end of button 22 that extends transversely to the displacement direction. Button 22 is urged by a return spring 28 that returns button 22 after it is released back to its basic position shown in FIG. 3. Reversing lever 25 is connected with locking mechanics 29 designed similarly to a so-called "Tippmatik" or ball-point pen mechanics. This locking device 29 performs two steps in succession, with each step being triggered by manual displacement of button 22 against return spring 28. In the first step, the reversing lever 25 pivoted by button 22 is locked in its end pivot position so that reversing lever 25 holds latching pin 20 displaced against the force of compression spring 21, and latching cam 201 has therefore escaped from latching holes 19, while in the second step that requires another actuation of button 22 following a previous return of button 22 by a return spring 28, reversing lever 25 is unlocked once more so that compression spring 21 is able to push latching pin 20 out once again, and reversing lever 25 is pivoted backward by dog 27.

In the embodiment shown in FIGS. 2 to 5, locking device 29 has a spring pawl 30 with a latching depression 301 as well as a latching wedge 253 that projects away from reversing lever 25, namely from its lever arm 252, said wedge cooperating with spring pawl 30 in such fashion that when it falls into latching depression 301, it blocks reversing lever 25 so that it cannot pivot backward. Locking device 29 is unlocked by lifting spring pawl 30, whereupon latching depression 301 is lifted away from latching wedge 253 and reversing lever 25 is freed to pivot backward by latching pin 20. To lift spring pawl 30 a control member 222 is mounted on button 22, said member, when button 22 is displaced, either overriding spring pawl 30 (FIG. 4) or passing under spring pawl 30 and thus lifting it (FIG. 5), depending on whether latching wedge 253 is located outside the latching depression 301 or engages latching depression 301. In FIG. 4, latching pin 20 is pushed out by compression spring 21. Latching wedge 253 abuts spring pawl 30 outside latching depression 301. When button 22 is displaced against the force of return spring 28, control element 222 overrides spring pawl 30.

Button 22 pivots reversing lever 25 in FIG. 3 clockwise, so that dog 27 moves latching pin 20 to the left while compressing compression spring 21 to the left in FIG. 3 and pulling latching cam 201 out of latching hole 19. As reversing lever 25 pivots, latching wedge 253 of reversing lever 25 slides along spring pawl 30 and finally, when latching pin 20 has been displaced to the maximum extent, drops into the latching depression 301 in spring pawl 30. If button 22 is then released, it is returned by return spring 28 to its original position. The latching wedge 353 held firmly in latching depression 301 prevents reversing lever 25 from pivoting backward and as a result holds latching pin 20 in its retracted position. Latching device 17 is ineffective and lid 11 can be opened and closed as desired after the snap latch is released. This position of latching device 17 with latching wedge 253 secured in latching depression 301 is illustrated in FIG. 5. If button 22 is then displaced again against return spring 28 (for the left in FIG. 5), spring pawl 30 with its pawl end facing control element 22 is raised to the point where control element 222 passes below spring pawl 30 and as button 22 is displaced further, lifts spring pawl 30 to the point where latching depression 301 lifts off latching wedge 253. A stop 223 is provided on button 22, said stop striking the front end of spring pawl 30, thus limiting the displacement travel of button 22.

The arrangement of this stop 223 is such that the space that remains between the lever arm 252 of reversing lever 25 which is in its locked pivot position and the end of button 22 which is blocked by stop 223 is sufficient to allow lever arm 252 of reversing lever 25 to pivot back again in front of the end of button 22 if, by lifting spring pawl 30, the locking device 29 is unlocked and latching pin 20 is pushed back into its pushed-out position by compression spring 21. This stop 223 then ensures that latching pin 20 can be pushed out completely, in other words it can enter its latching position without button 22 having to be released first. If lid 11 is raised to the point where latching pin 20 enters the area of latching strip 18, latching pin 20 engages the bottom latching hole 19 by its latching cam 201. If a higher position of the arm rest is desired, lid 11 can simply be pulled further upward without having to press button 22 again. This is made possible by a slight bevel 31 in the upper area of upper latching hole 19 (FIG. 2) causing latching pin 20 to be pushed inward axially slightly in such fashion that when the upper latching hole 19 is reached it can be pushed out again by compression spring 21. The number of latching holes 19 provided in latching strip 18 can be specified as desired so that any number of pivot positions of the arm rest can be selected.

Figure 2:
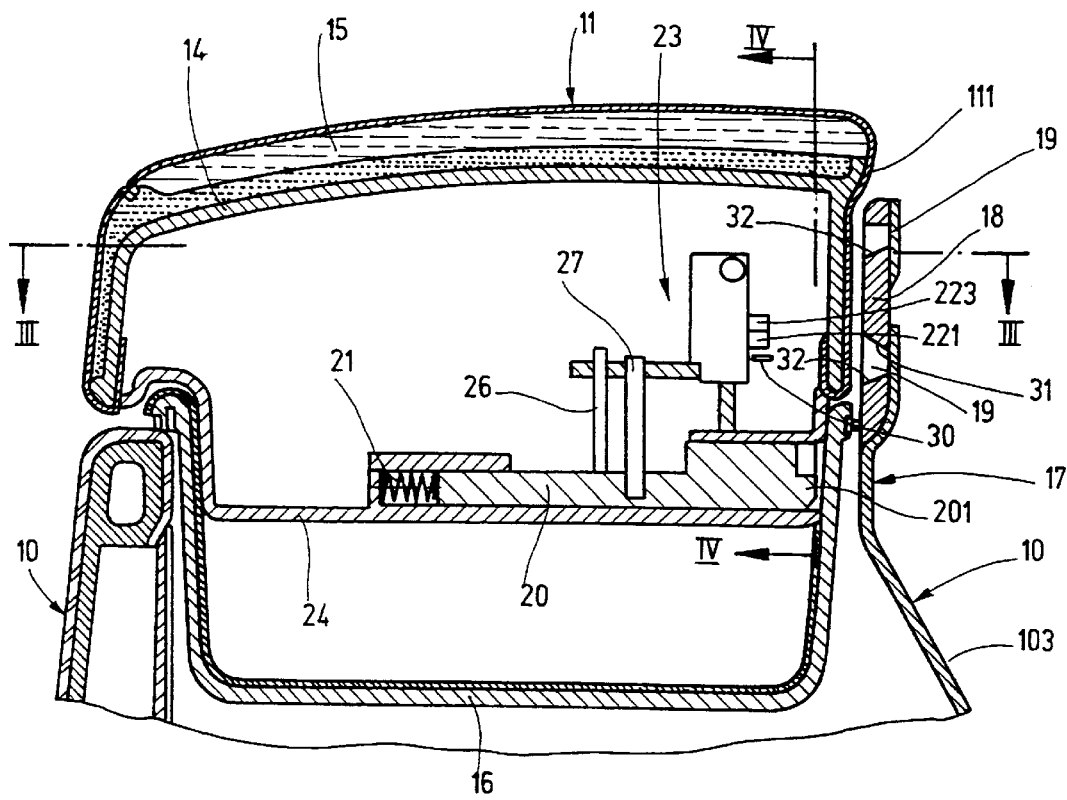
FIG. 2 is a section along line II—II in FIG. 1.

If the arm rest which is at a certain height setting can no longer be used, button 22 is pressed again so that, as described above, latching pin 20 is pushed in against compression spring 21 and is locked by reversing lever 25 by means of locking device 29. Now lid 11 can be lowered again until it completely closes the housing opening or it can be raised until the housing opening is completely free. When lid 11 closes housing 10, the latching pin 20 that has been pushed in and locked is in storage shell 16. If button 22 is pressed when lid 11 is closed and lid 11 is not raised, latching pin 20 is unlocked but projects only to the point where its latching cam 201 internally abuts storage shell 16 (FIG. 2). If lid 11 is then raised, latching pin 20 automatically enters the bottom latching hole 19 in latching strip 18.

Protection against overloading the latching device 17 by excessive pressure on the arm rest is ensured by the fact that latching holes 19 are also provided on the bottom with a bevel 32. As a result of bevel 32, if lid 11 is subjected to excessive stress, latching pin 20 is subjected to a force axially by latching cam 201 until compression spring 21 yields to this force and latching pin 20 moves inward to the point where latching cam 201 comes out of latching hole 19. As a result, lid 11 is lowered onto the housing 10 and the force is conducted directly from lid 11 to housing 10.

Figure 6:
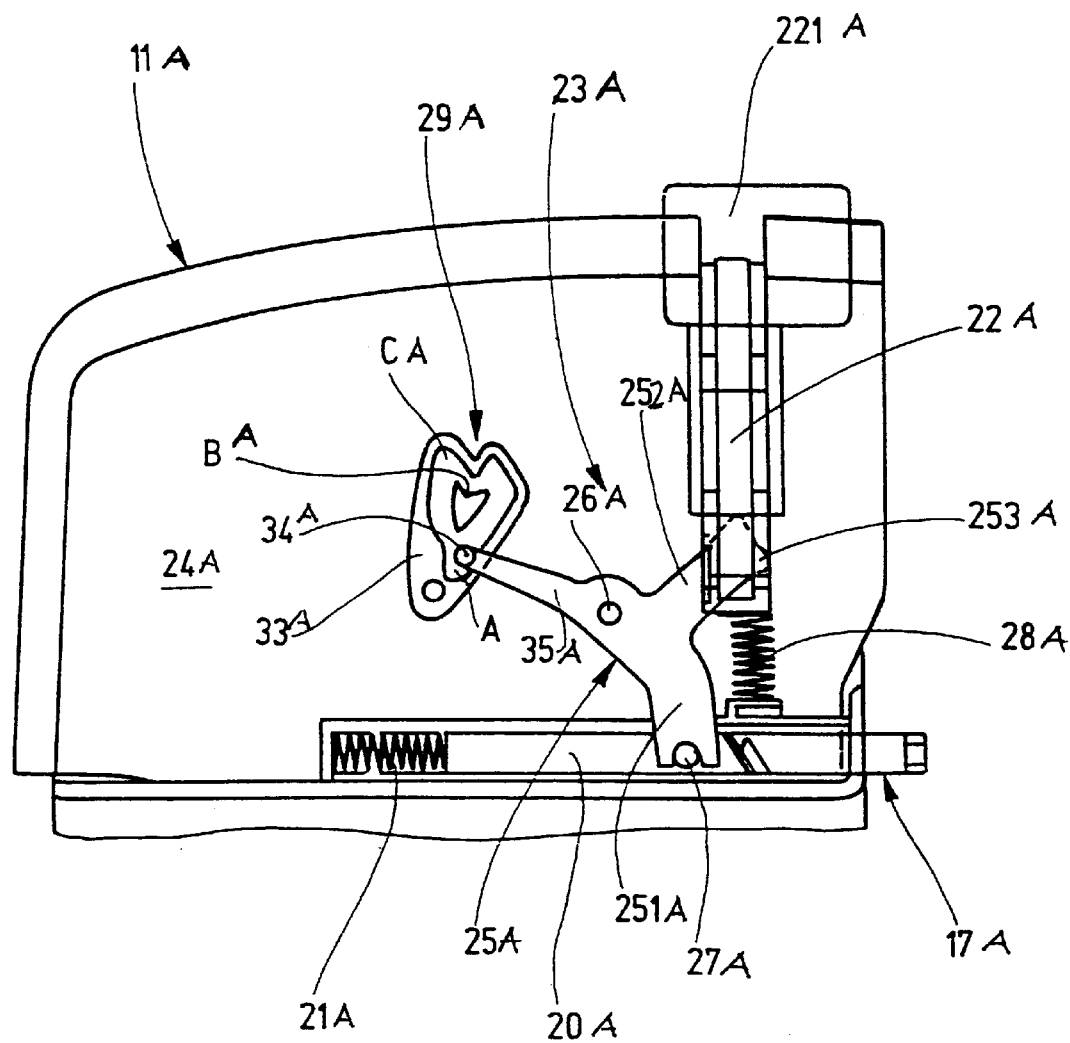
FIG. 6 is a view similar to that in FIG. 3 of a modified container.

In FIG. 6, similar reference characters as used in FIGS. 1–5, with a suffix "A" are used to designate generally similar features. The modified kinematic linkage 23A shown in FIG. 6 for latching device 17A is modified to the point where locking device 29A has a heart-shaped latching bracket 33A in which a guide pin 34A is guided that projects from an arm 35A preferably mounted in one piece on reversing lever 25A. When latching pin 20A is pushed out by compression spring 11A, guide pin 34A, as shown in FIG. 6, is located in the position marked A. When button 22A is actuated and reversing lever 25A is pivoted, guide pin 34A is guided in latching bracket 33A and when button 22A is released latches in position B. Latching pin 22A is pushed in when compression spring 21A is compressed and latches in latching bracket 33A by means of reversing lever 25A. When button 22A is actuated again, guide pin 34A moves into position C. When the load on button 22A is released, guide pin 34A moves into position A and latching pin 22A is pushed out by compression spring 21A. This locking device 29A however has the disadvantage by comparison with the previously described locking device 29 according to FIGS. 2 to 5 that latching pin 20A extends only after button 22A is released, which is less favorable from the standpoint of operating comfort.

The invention is not limited to the embodiments described above. Thus, instead of a single latching pin 20, 20A two latching pins can be provided that cooperate with latching strips 18 mounted on both sides on the housing. As a result, a bilateral latching of lid 11 on housing 10 is possible that permits a better conduction of forces into housing 10. Instead of a unilateral or bilateral latching of the lid 11 on housing 10, lid 11 can also be latched using the same principle at housing front wall 102, with the latching strip 18 then being mounted on the front wall 102 of the housing 10 and with latching pin 22 being displaceably guided on the lengthwise axis of housing 10 or lid 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Coverable container that can be installed beside seats in vehicles comprising: a box-shaped housing open at the top, with a lid pivotable around a pivot axis integral with the housing and simultaneously designed as an arm rest, for covering the housing opening, and with a latching device operable between the housing and the lid for locking the lid in pivot positions that modify the height of the arm rest on the housing, the latching device including a latching strip with latching holes arranged vertically above one another and at least one spring-loaded latching pin that drops into the latching holes for locking, wherein the latching device is located on a side of the housing that is opposite the pivot axis, wherein the at least one spring-loaded latching pin of the latching device is aligned parallel to the pivot axis of the lid and guided displaceably lengthwise in the lid, and wherein the latching strip is provided on a housing wall of the housing that extends transversely to the lengthwise axis of the latching pin.

2. Container according to claim 1, wherein a manually operable button is provided for lengthwise displacement of the latching pin on the lid, said button being coupled by a kinematic linkage with the latching pin, and wherein the latching pin, the button, and the kinematic linkage are provided on an underside of the lid that is lowered into the housing opening and located in a front end area of the lid, and preferably is preassembled on a kinematic support that is mounted on the underside of the lid.

3. Container according to claim 2, wherein the arrangement of the latching pin and the latching strip is made such that the latching pin, when the lid rests on the housing opening, is located below the latching strip and, after a slight lifting of the lid, drops under spring force into a bottom latching hole of the latching strip.

4. Container according to claim 2, wherein the button is displaceably guided transversely to the latching pin against spring force of a return spring, wherein the kinematic linkage comprise a two-armed reversing lever, said lever being mounted to pivot around a pivot axis at right angles to a plane spanned by displacement directions of the button and the latching pin, and with its one lever arm for pivoting by the button abutting the latter and with another lever arm articulated on the latching pin, and wherein the reversing lever is connected with a locking mechanism which successively, with each displacement of the button against the return spring, locks the reversing lever alternately in a pivot position that holds the latching pin displaced against a spring force and frees it for a backward pivoting movement.

5. Container according to claim 3, wherein the button is displaceably guided transversely to the latching pin against spring force of a return spring, wherein the kinematic linkage comprise a two-armed reversing lever, said lever being mounted to pivot around a pivot axis at right angles to a plane spanned by displacement directions of the button and the latching pin, and with its one lever arm for pivoting by the button abutting the latter and with another lever arm articulated on the latching pin, and wherein the reversing lever is connected with a locking mechanism which successively, with each displacement of the button against the return spring, locks the reversing lever alternately in a pivot position that holds the latching pin displaced against a spring force and frees it for a backward pivoting movement.

6. Container according to claim 4, wherein the locking device has a spring pawl that extends parallel to the displacement direction of the button, with a latching depression for a latching wedge that projects from the reversing lever and a control element mounted on the button for lifting spring pawl.

7. Container according to claim 6, wherein the design and arrangement of the spring pawl and the latching wedge are made so that when the latching wedge is in the latching depression, spring pawl is raised to a point where control element, when the button is displaced, fits under a front end of the spring pawl and can lift the spring pawl to the point where the latching depression is lifted off the latching wedge.

8. Container according to claim 7, wherein a stop is provided on the button to limit displacement of the button, said stop, with the spring pawl raised by latching wedge being latched in the latching depression, abutting the free end of the pawl.

9. Container according to claim 8, wherein the arrangement of the stop is made such that the space remaining between the lever arm of the reversing lever which is in its locked pivot position and of the button which is blocked by the stop is sufficient for latching pin, displaced by spring force, to enter an end position without blocking the pivoting movement in the arm reversing lever when the latching wedge is lifted out of the latching depression.

10. Container according to claim 5, wherein the locking device has a spring pawl that extends parallel to the displacement direction of the button, with a latching depression for a latching wedge that projects from the reversing lever and a control element mounted on the button for lifting spring pawl.

11. Container according to claim 10, wherein the design and arrangement of the spring pawl and the latching wedge are made so that when the latching wedge is in the latching depression, spring pawl is raised to a point where control element, when the button is displaced, fits under a front end of the spring pawl and can lift the spring pawl to the point where the latching depression is lifted off the latching wedge.

12. Container according to claim 11, wherein a stop is provided on the button to limit displacement of the button, said stop, with the spring pawl raised by latching wedge being latched in the latching depression, abutting the free end of the pawl.

13. Container according to claim 12, wherein the arrangement of the stop is made such that the space remaining between the lever arm of the reversing lever which is in its locked pivot position and of the button which is blocked by the stop is sufficient for latching pin, displaced by spring force, to enter an end position without blocking the pivoting movement in the arm reversing lever when the latching wedge is lifted out of the latching depression.

14. Container according to claim 4, wherein locking device has a fixed heart-shaped latching bracket and a guide pin guided in the latching bracket, said guide pin being mounted on the reversing lever.

15. Container according to claim 1, wherein the latching holes in the latching strip are provided with a bevel at their upper limiting wall.

16. Container according to claim 1, wherein the latching holes in the latching strip are provided with a bevel at their lower limiting wall.

17. Container according to claim 15, wherein the latching holes in the latching strip are provided with a bevel at their lower limiting wall.

18. A coverable container disposable as a center console adjacent a vehicle seat, comprising:

a housing defining a stowage space and having a top opening, a lid pivotally connected to the housing at a first side of the top opening by a pivot connection assembly, said lid having an upper surface which in use forms an arm rest, and a latching assembly disposed at a second side of the top opening and operable separately from the pivot connection assembly to selectively latch the lid to the housing in respective different vertical positions to thereby accommodate vertical adjustment of the arm rest position of the lid while said lid is in a closed position, wherein the latching assembly comprises at least one spring-loaded latching pin which is aligned parallel to the pivot axis of the lid and guided displaceably lengthwise in the lid, and wherein the latching assembly has a latching strip having latching holes and is provided on a housing wall of the housing that extends transversely to the lengthwise axis of the latching pin.

19. A coverable container according to claim 18, wherein the second side is opposite the first side of the top opening, and wherein a manually operable button is provided for lengthwise displacement of the latching pin on the lid, said button being coupled by a kinematic linkage with the latching pin, and wherein the latching pin, the button, and the kinematic linkage are provided on an underside of the lid that is lowered into the housing opening and located in a front end area of the lid, and preferably is preassembled on a kinematic support that is mounted on the underside of the lid.

* * * * *